United States Patent Office 3,816,619
Patented June 11, 1974

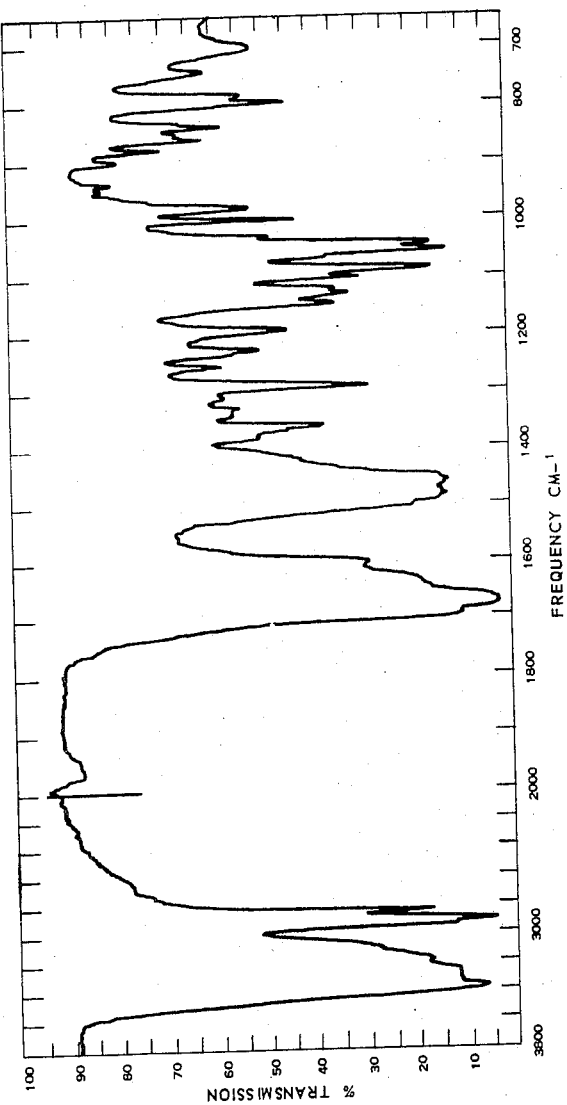

3,816,619
LADAKAMYCIN AND PROCESS FOR PREPARING SAME
Malcolm E. Bergy, Ladislav J. Hanka, and Ross R. Herr, Kalamazoo, and Donald J. Mason, Portage, Mich., assignors to The Upjohn Company, Kalamazoo, Mich.
Continuation-in-part of abandoned application Ser. No. 482,472, Aug. 25, 1965. This application Aug. 30, 1965, Ser. No. 483,723
Int. Cl. A61k 21/00; C07d 51/52
U.S. Cl. 424—116                6 Claims

ABSTRACT OF THE DISCLOSURE

New antibiotic ladakamycin and a microbiological process for the production thereof using the microorganism *Streptoverticillium ladakanus* var. *ladakanus*. Ladakamycin can be used to inhibit the growth of various bacteria, for example, *Pseudomonas aeruginosa*, *Proteus vulgaris*, *Aerobacter aerogenes*, and *Escherichia coli*.

---

This application is a continuation-in-part application of Bergy et al. pending application Ser. No. 482,472, filed Aug. 25, 1965, and now abandoned.

This invention relates to a novel composition of matter and to a process for the production thereof. More particularly, this invention relates to a new compound, ladakamycin, U–18,496, and to a process for the production thereof.

Ladakamycin is an organic compound producible by culturing a ladakamycin-producing actinomycete in an aqueous nutrient medium. It is a basic substance which has the property of adversely affecting the growth of certain organisms, particularly bacteria, for example, *Pseudomonas aeruginosa*, *Proteus vulgaris*, *Aerobacter aerogenes*, *Salmonella gallinarum*, *Salmonella pullorum*, *Salmonella schottmuelleri*, and *Escherichia coli*, and can be used alone or in combination with other antibacterial agents to prevent the growth of, or reduce the number of, such organisms present in various environments. For example, it can be used in papermill systems to inhibit the growth of *Aerobacter aerogenes* which is known to produce slime in such systems. It is also useful as an oil preservative, for example, as a bacteriostatic agent for inhibiting the growth of *Proteus vulgaris* which is known to cause spoilage in cutting oils. Also, it is useful in wash solutions for sanitation purposes, as in the washing of hands and the cleaning of equipment, floors, or furnishings of contaminated rooms or laboratories; it is also useful as an industrial preservative, for example, as a bacteriostatic rinse for laundered clothes and for impregnating paper and fabrics; and it is useful for suppressing the growth of sensitive organisms in plate assays and other microbiological media. It can also be used as a feed supplement to promote the growth of animals.

Ladakamycin is also active in mice against T–4 lymphoma.

THE MICROORGANISM

The actinomycete used according to this invention for the production of ladakamycin has been designated as *Streptoverticillium ladakanus* var. *ladakanus* sp. nova. One of its strain characteristics is the production of ladakamycin. A subculture of the living organism can be obtained from the permanent collection of the Northern Utilization and Research Division, Agricultural Research Service, The U.S. Department of Agriculture, Peoria, Ill., U.S.A. Its accession number in this repository is NRRL 3191. The characteristics of *Streptoverticillium ladakanus* var. *ladakanus* sp. nova., NRRL 3191, are given in the following tables:

Table I—Appearance on Ektachrome
Table II—Assimilation of Carbon Compounds in Synthetic Medium (J. Bact., 56: 107–114, 1948).
Table III—Cultural Characteristics
Table IV—Color Characteristics—According to the Color Harmony Manual, 3rd Edition, 1948, and the ISCC-NBS Method of Designating Colors and a Dictionary of Color Names, NBS Circular 553
Table V—Microscopic Characteristics

TABLE I.—APPEARANCE ON EKTACHROME [1]

*S. ladakanus* v. *ladakanus*

| Agar medium: | Appearance |
|---|---|
| Bennett's | Cottony white aerial growth. Yellow reverse. |
| Czapek's sucrose | Trace cottony white aerial growth. Colorless reverse. |
| Maltose tryptone | Cottony white aerial growth. Yellow reverse. |
| Peptone iron | No aerial growth. Tan reverse. |
| 0.1% tyrosine | Cottony white aerial growth. Colorless reverse. |
| Casein starch | Cottony white aerial growth. Colorless reverse. |

[1] Deity, A., "Ektachrome Transparencies as Aids in Actinomycete Classification," Annals of the N.Y. Academy of Sciences, 60: 152–154, 1954.

TABLE II

[Assimilation of carbon compounds in synthetic medium by *S. ladakanus* v. *ladakanus*]

| Run number | 1 | 2 | 3 |
|---|---|---|---|
| Control | (−) | − | (−) |
| 1. D-xylose | (−) | − | (−) |
| 2. L-arabinose | (−) | − | (−) |
| 3. rhamnose | (−) | − | (−) |
| 4. D-fructose | (+) | − | (+) |
| 5. D-galactose | (+) | (−) | + |
| 6. D-glucose | (+) | (−) | + |
| 7. D-mannose | + | (−) | + |
| 8. maltose | − | − | + |
| 9. sucrose | + | − | (+) |
| 10. lactose | (−) | (−) | (+) |
| 11. cellobiose | (−) | − | (+) |
| 12. raffinose | (−) | (−) | (+) |
| 13. dextrin | + | − | + |
| 14. insulin | (−) | − | (+) |
| 15. soluble starch | + | (−) | + |
| 16. glycerol | (+) | (−) | + |
| 17. dulcitol | (−) | (−) | (+) |
| 18. D-mannitol | − | − | (+) |
| 19. D-sorbitol | (−) | − | (+) |
| 20. inositol | (+) | − | (+) |
| 21. salicin | (+) | − | − |
| 22. phenol | − | | − |
| 23. cresol | − | | − |
| 24. Na formate | (−) | − | − |
| 25. Na oxalate | (−) | − | − |
| 26. Na tartrate | − | − | − |
| 27. Na salicylate | − | − | − |
| 28. Na acetate | − | − | − |
| 29. Na citrate | − | (+) | (−) |
| 30. Na succinate | − | − | (−) |

Note.—
+ = Positive assimilation.
− = Negative assimilation.
(−) = Slight growth—no assimilation.
(+) = Positive assimilation—only slight growth.

TABLE III

[Cultural Characteristics of *S. ladakanus* v. *ladakanus*]

| Agar medium | Run No. 1 | Run No. 2 | Run No. 3 | Run No. 4 |
|---|---|---|---|---|
| Peptone iron | No aerial growth; Colorless vegetative flecked with red; Melanin negative. | No aerial growth; Colorless vegetative with traces of red; Melanin negative. | No aerial growth; Colorless vegetative growth; Melanin negative. | No aerial growth; Pale tan vegetative; Melanin ±. |
| Calcium malate | Trace white aerial growth; White reverse; Malate not solubilized. | Pale gray-white aerial growth; Pale gray-white reverse; Malate not solubilized. | | Trace white aerial growth; White reverse; No pigment; Malate not solubilized. |
| Glucose asparagine | Gray-white aerial growth; Pale cream reverse. | Pale gray-pink aerial growth; Yellow reverse; Yellow pigment. | | Trace cream-white aerial growth; Yellow reverse; Yellow pigment. |
| Skim milk | Trace white aerial growth; Colorless vegetative growth; Yellow pigment; Casein not solubilized. | Pale gray-white aerial growth; Yellow reverse; Casein not solubilized. | Very slight trace white aerial growth; Yellow reverse; Yellow pigment; Casein not solubilized. | Very slight trace white aerial growth; Yellow reverse; Yellow pigment; Casein not solubilized. |
| Nutrient starch | Cottony cream-white aerial growth; Yellow reverse; Yellow pigment. | Cottony white aerial growth; Yellow reverse; Yellow pigment; Starch hydrolyzed. | | |
| Maltose tryptone | Cottony cream-white aerial growth; Yellow reverse; Yellow pigment. | Cottony cream-white aerial growth; Yellow reverse; No pigment. | Yellow vegetative growth; Yellow pigment. | |
| Bennett's | Cottony cream-white aerial growth; Yellow reverse; Yellow pigment. | Cottony cream-white aerial growth; Deep yellow reverse; Yellow pigment. | Cottony white aerial growth; Yellow vegetative; No pigment. | |
| Czapek's sucrose | Cottony pale-gray aerial growth; Pale gray reverse. | | Cottony white aerial growth; White reverse; No pigment. | |
| Xanthine | Trace white aerial growth; Yellow tan reverse; Yellow pigment; Xanthine not solubilized. | Trace white aerial growth; Pale tan reverse; Pale tan pigment; Xanthine not solubilized. | Pale yellow vegetative growth; Pale yellow pigment; Xanthine not solubilized. | Cottony white aerial growth; Pale yellow vegetative growth; Pale yellow pigment; Xanthine not solubilized. |
| Tyrosine | Cottony white aerial growth; Yellow reverse; Yellow pigment; Tyrosine solubilized. | Gray-pink aerial growth; Olive reverse; Trace yellow pigment; Tyrosine solubilized. | Pale yellow vegetative growth; Pale yellow pigment; Tyrosine not solubilized. | |
| Litmus milk | | Gray-pink aerial growth; Lavender reverse; Lavender pigment; Casein solubilized. | Slight trace gray aerial growth; Red lavender reverse; Red lavender pigment; Casein solubilized. | |
| Purple milk | | Gray-cream aerial growth; Olive reverse; Blue-green pigment; Casein solubilized. | Blue-green reverse; Blue-green pigment; Casein not solubilized. | |
| Casein starch | | Cream-white aerial growth; Pink-tan reverse; No pigment; Starch hydrolyzed. | | Cottony pink-white aerial growth; Pale yellow reverse; No pigment. |
| Tomato Paste oatmeal | | | | Cottony white aerial growth Yellow reverse; Yellow pigment. |

TABLE IV

[Color Characteristics of *S. ladakanus* v. *ladakanus*]

| | Color Harmony Manual, 3rd Ed. | ISCC-NBS Color Names |
|---|---|---|
| Bennett's agar: | | |
| Surface | Gray b—oyster white | 263m white; 264g light gray. |
| Reverse | 1ba—yellow tint | 92m yellowish white; 121gm pale yellow-green. |
| | 2fb—bamboo, buff, straw, wheat. | 87g moderate yellow; 89m pale yellow. |
| Czapek's sucrose agar: | | |
| Surface | Gray b—oyster white | 263m white; 264g light gray. |
| Reverse | do | 263m white; 264g light gray. |
| Maltose-tryptone agar: | | |
| Surface | Gray b—oyster white | 263m white; 264g light gray. |
| Reverse | 1ba—yellow tint | 92m yellowish white; 121gm pale yellow-green. |
| | 2fb—bamboo, buff, straw, wheat. | 87g moderate yellow; 89m pale yellow. |

TABLE V

Microscopic characteristics of *S. ladakanus* v. *ladakanus*

Light microscope _____ Sporophores biverticillate.
Electron microscope:
    Direct _____ Long, smooth spores.
    Carbon replica __ Long, smooth spores with surface ridging.

The new compound of the invention is produced when the elaborating organism is grown in an aqueous nutrient medium under submerged aerobic conditions. It is to be understood also that for the preparation of limited amounts surface cultures in bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, corn starch, galactose, dextrin, molasses, and the like. Preferred nitrogen sources include corn steep liquor, yeast, autolyzed brewer's yeast with milk solids, soybean meal, cottonseed meal, corn meal, milk solids, pancreatic digest of casein, distiller's solubles, fish meal, animal peptone liquors, meat and bone scraps, and the like. A combination of these carbon and nitrogen sources can be used advantageously. Trace metals, for example, zinc, magnesium, manganese, cobalt, iron, and the like need not be added to the fermentation since tap water and unpurified ingredients are used as media components.

Production of the compound of the invention can be effected at any temperature conducive to satisfactory growth of the microorganism, for example, between about 18° and 40° C. and preferably between about 25° and 30° C. Ordinarily, optimum production of the compound is obtained in about 2 to 10 days. The medium normally stays fairly close to neutral, or on the acid side during the fermentation. The final pH is dependent, in part, on the buffers present, if any, and in part on the initial pH of the culture medium which is advantageously adjusted to about pH 6–8 prior to sterilization.

When growth is carried out in large vessels and tanks, it is preferable to use the vegetative form, rather than the spore form, of the microorganisms for inoculation to avoid a pronounced lag in the production of the new compound and the attendant inefficient utilization of equipment. Accordingly, it is desirable to produce a vegetative inoculum in a nutrient broth culture by inoculating the broth culture with an aliquot from a soil or slant culture. When a young, active, vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new compound of the invention is a basic compound having the empirical formula $C_8H_{12}N_4O_5$. At room temperature, ladakamycin is soluble to the extent of approximately 40 mg./ml. in water but is soluble at less than 1 mg./ml. in methanol and higher alcohols, acetone, chloroform, hexane, and dimethylsulfoxide.

A variety of adsorbents can be used in the isolation and purification of ladakamycin. In a preferred process, ladakamycin is recovered from its culture medium by separation of the mycelia and undissolved solids by conventional means such as by filtration or centrifugation. The antibiotic is then removed from the filtered or centrifuged broth by the use of surface active adsorbents, for example, decolorizing carbon or decolorizing resins, and elution of the adsorbed material with a solvent. Any of the solvents mentioned above in which ladakamycin is soluble can be used. A suitable decolorizing resin is Permutit DR (U.S. Pat. 2,702,263). The eluates obtained from the surface active adsorbents can be evaporated to dryness to provide an impure preparation of the antibiotic ladakamycin. This preparation can be used in environments where higher purity of the antibiotic is not necessary.

High purity ladakamycin can be obtained by subjecting an impure preparation of ladakamycin, as obtained above, to partition chromatography using the following solvent system: n-butanol (7.5); ethyl acetate (2.5); pH 6.0 McIlvaine buffer (3.5). The fractions obtained from partition chromatography are freeze-dried and then can be subjected to silica gel chromatography using solvents such as chloroform and methanol to effect a higher degree of purification. Fractions obtained from silica gel chromatography can be concentrated to obtain crystalline ladakamycin.

The new compound of the invention, ladakamycin, is active against *Escherichia coli* and can be used to reduce, arrest and eradicate slime production in papermill systems caused by its antibacterial action against this microorganism. It can also be used to prolong the life of cultures of *Trichomonas foetus*, *Trichomonas hominis*, and *Trichomonas vaginalis* by freeing them of *Escherichia coli* contamination. Dried fermentation whole beers containing ladakamycin can be used in chicken feed at the rate of 100 mg. per pound of feed to improve the weight gains in chickens and thus promote improved feed utilization. A representative feed experiment showed a weight gain of 4.2% in chickens and improved feed utilization of 1.8% when dried ladakamycin fermentation whole broth was incorporated in feed at 100 mg. per pound of feed.

The following examples are illustrative of the process and products of the present invention but are not to be construed as limiting. All percentages are by weight and all solvent mixture proportions by volume unless otherwise noted.

EXAMPLE 1

(A) Fermentation

A soil stock of *Streptoverticillium ladakanus* var. *ladakanus* sp. nova., NRRL 3191 was used to inoculate a series of 500-ml. Erlenmeyer flasks containing 100 ml. of sterile pre-seed medium consisting of the following ingredients:

|  | G./liter |
|---|---|
| Glucose monohydrate | 10 |
| Yeastolac [1] | 10 |
| N-Z Amine B [2] | 5 |
| Tap water, q.s., 1 liter. | |

[1] A protein hydrolysate of yeast cells.
[2] A bulk peptone in powder form obtained by the pancreatic digestion of casein.

The pre-seed medium pre-sterilization pH was 7.2. The pre-seed inoculum was grown for three days at 28° C. on a Gump rotary shaker operating at 260 r.p.m.

The pre-seed inoculum (100 ml.) was used to inoculate a 40-liter seed tank containing 20 liters of the following sterile seed medium:

|  | G./liter |
|---|---|
| Glucose monohydrate | 10 |
| Corn steep liquor | 10 |
| Pharmamedia [1] | 2 |
| Wilson's peptone liquor No. 159 [2] | 10 |
| Tap water | Balance |

[1] Pharmamedia is an industrial grade of cottonseed flour produced by Trader's Oil Mill Company, Fort Worth, Tex.
[2] Wilson's Peptone Liquor No. 159 is a preparation of enzymatically hydrolyzed proteins of animal origin.

The pre-sterilization pH of the seed tank medium was 7.2. The seed inoculum was grown for 24 hours at a temperature of 28° C. with aeration at the rate of 10 standard liters per minute and stirring at the rate of 400 r.p.m.

A portion of the seed inoculum (12.5 liters), described above, was then used to inoculate a 400-liter fermentor containing 250 liters of the following sterile fermentation medium:

| | |
|---|---|
| Starch | G./liter 30 |
| Blackstrap molasses | do 20 |
| Fish meal | do 15 |
| Glucose monohydrate | do 10 |
| Corn gluten meal | do 15 |
| Lard oil | ml./liter 5 |
| Tap water | Balance |

The pre-sterilization pH of the fermentation tank medium was 7.2. The fermentation cycle was 5 days during which time the temperature was controlled at 28° C., filtered air was supplied at a rate of 200 standard liters per minute, and agitation was at the rate of 280 r.p.m. Sterile lard oil was added to control foaming.

(B) Recovery

The whole broth from a ladakamycin fermentation, as described above, was slurried with 3% of its weight of diatomaceous earth and filtered. The cake was washed with one-tenth volume of water and the wash added to the filtered beer. Activated carbon (6% w./v.) was added to the combined filtered beer and wash. This slurry was stirred for 30 minutes and then filtered with the aid of a filter aid as required. The cake was washed with one-tenth volume of water and the wash added to the filtrate. The remaining cake was stirred with one-third original beer volume of 50% aqueous acetone for 15 to 20 minutes and then the slurry was filtered. This operation was repeated twice to produce three filtrates which were combined. The combined filtrates were reduced to one-twentieth volume under reduced pressure (less than 30° C.). The resulting concentrate was then poured into a stirring mixture of 5 volumes of acetone with 5% diatomaceous earth. The solids were removed by filtration and the filtrate concentrated to an aqueous solution and freeze-dried to obtain a crude preparation of ladakamycin. The recovery process, described above, gave the following balance sheet on a ladakamycin fermentation broth:

| | Amount, ml. | Assay, biounits/ml. |
|---|---|---|
| Whole beer | 500 | 12 |
| Clear beer | 500 | 12 |
| Spent beer | 480 | 0 |
| Acetone eluates | 445 | 11 |
| Concentrate | 23 | 220 |
| Dry preparation of ladakamycin | [1] | [2] |

[1] 575 mg.
[2] 2.25 biounits/mg.

The ladakamycin content of the various preparations in the recovery process described above was ascertained by a microbiological assay using the organism *Salmonella schottmuelleri*. The assay procedure is as follows:

Nutrient agar was inoculated with an 18–20 hour culture of *S. schottmuelleri*, grown in nutrient broth on the reciprocating shaker at 37° C., at the rate of 0.2 ml. of the culture per 100 ml. agar. The seeded medium was dispensed into 100 x 20 mm. plastic petri dishes in 8-ml. portions and the agar was allowed to solidify. The fermentation beers were tested at full strength and diluted ½, ¼ and ⅛ in the 0.1 M phosphate buffer of pH 6.0. Each solution was applied to one paper disc (12.7 mm.) on each of two replicate plates and the plates were incubated overnight at 30° C. The zones of inhibition were then measured and the potency of each sample was expressed in biological units. The biological unit (BU) is defined as the concentration of the antibiotic which gives a 20 mm. zone of inhibition under the standard assay conditions. Thus, if for instance a fermentation beer has to be diluted ¹⁄₁₀₀ to give the 20 mm. zone of inhibition, the potency of such beer is 100 BU per ml.

(C) Purification (1) *Partition chromatography.*—A crude preparation of ladakamycin, as obtained above, was passed over a partition column prepared as follows: The solvent system consisted of n-butanol (750), ethyl acetate (250), and pH 6.0 McIlvaine buffer (350). 150 g. of diatomaceous earth was slurried in the upper phase and the slurry was homogenized with 60 ml. of lower phase. A two inch (I.D.) column was packed with this preparation to a constant height of approximately 13 inches using air pressure. 10 g. of a dry crude preparation of ladakamycin, as obtained in Part B above, was dissolved in 10 ml. of lower phase. This was homogenized with 20 g. of diatomaceous earth and upper phase. The slurry was then carefully poured onto the top of the prepared partition column bed and packed with air pressure. The column was developed with upper phase and 20 ml. fractions were collected. The active fractions, as determined by the microbiological assay against the microorganism *Salmonella schottmuelleri*, as described above, were pooled and two volumes of Skellysolve B (isomeric hexanes) was added. The aqueous phase was separated and the upper phase was then rinsed with about .05 volume of water. The aqueous phases and water washes were combined and freeze-dried; yield, 1.30 grams of ladakamycin assaying 12.7 biounits/mg. against *S. schottmuelleri*.

(2) *Silica gel chromatography.*—(a) Column preparation: The materials in the silica gel column were as follows:

Buffer salts: $KH_2PO_4$ and $Na_2HPO_4$
Silica gel: Silica gel No. 7734 (E. Merck AG—Darmstadt) 0.05–0.20 mm. for chromatography
Solvents: Chloroform, methanol.

Each kilogram of silica was buffered by mixing thoroughly with 800 ml. of an aqueous solution containing 27.2 g. of $KH_2PO_4$ and 28.4 g. of $Na_2HPO_4$. The water was removed by drying at less than 100° C. and then the gel was activated at a temperature of 120–130° C. for at least two hours. After the buffered and activated silica gel was cooled, it was slurried in enough chloroform to provide a pourable mixture, yet thin enough in consistency to allow gas pockets to escape. This slurry was poured into a column and packed to a constant height using air pressure. A good head of chloroform was left on the top.

(b) Preparation of starting material: For each kilogram of silica gel used in the preparation of the column above, 7.3 g. of ladakamycin preparation, as obtained in Part C(1) above, was dissolved in 40 ml. of methanol and mixed thoroughly with 90 g. of buffered, activated silica gel. The methanol was removed by evaporation in air at room temperature, and the dried silica gel containing the crude ladakamycin was distributed evenly into the head of chloroform remaining on the column bed. The level of chloroform was then drained to approximately 6 inches above the level of the layer of starting material.

(c) Development of the column: The silica gel column was developed by carefully layering the developing system consisting of chloroform and methanol (7:3) onto the top of the chloroform and starting the flow. The column was developed with this system at a flow rate of approximately 666 ml./hour/kilogram column bed; 133 ml./kilogram column bed fractions were collected during the development. All the operations during the development stage were performed at room temperature. The collected fractions and the crystalline ladakamycin which resulted therefrom were kept cold (less than −20° C.).

The fractions collected from the silica gel column were assayed by evaporating 1 ml. portions from each fraction to dryness and reconstituting the residue in water. Those fractions assaying approximately 6.0 biounits/ml. and greater against the organism *E. coli* were concentrated to about ¹⁄₁₀₀ volume *in vacuo* at less than 40° C. This concentrate was purified by filtration and the concentration was continued to approximately ¹⁄₅₀₀ volume. Crystallization of ladakamycin occurred during this concentration. The ladakamycin crystals were removed by filtration, washed lightly with methanol, and dried *in vacuo* at room temperature to a constant weight. Recrystallization of the ladakamycin crystals was achieved by dissolving the ladakamycin crystals in boiling methanol at a rate of 1 mg./ml. The solution was purified by filtration and concentrated *in vacuo* at less than 40° C. to 25 mg./ml. The concentrate was refrigerated overnight and ladakamycin crystals which precipitated were removed by filtration, washed lightly with methanol, and then with chloroform. The ladakamycin crystals were dried *in vacuo* to a constant weight.

The *E. coli* microbiological assay disclosed above is as follows:

The microorganism was grown for 18–20 hours at 30° C. on a reciprocating shaker in the following synthetic medium: $K_2HPO_4$, 3.5 g.; $KH_2PO_4$, 1.5 g.; $MgSO_4 \cdot 7H_2O$, 0.1 g.; $(NH_4)_2SO_4$, 1.0 g.; glucose, 2.0 g.; distilled water, 1 liter.

The synthetic agar used for assay was prepared by further supplementing this synthetic broth with 15 g. of agar per liter. This agar was inoculated at the rate of 0.3 ml. of the culture per 100 ml. of agar. The rest of the assay procedure is identical with that described previously for *S. schottmuelleri*. The assay employing *E. coli* grown on synthetic medium is about seven times more sensitive than the assay with *S. schottmuelleri* grown in nutrient agar.

The silica gel chromatography procedure, described above, was applied to crude preparations of ladakamycin obtained from the partition column as described in Part C(1). However, this same procedure has also been sucessfully applied to crude ladakamycin preparations obtained from the recovery operation described in Part B above.

Chemical and physical properties of ladakamycin

Elemental analyses: Calcd. for $C_8H_{12}N_4O_5$: C, 39.34; H, 4.95; N, 22.94; O, 32.77. Found: C, 39.25; H, 5.04; N, 22.87; O, 31.44.

Calculated molecular weight: 244.2.

Ultraviolet spectrum: Ladakamycin has the following UV absorption spectrum:

Water: max. at 241 mμ, a=35.9.
.01N HCl: max. at 249 mμ, a=12.6.
.01N KOH: max. at 223 mμ, a=99.1.
sh: at 253 mμ, a=6.3.

Melting point: 228–230° C.

Solubility: Ladakamycin is soluble at room temperature to the extent of approximately 40 mg./ml. in water, but is soluble at less than 1 mg./ml. in methanol and higher alcohols, acetone, chloroform, hexane, and dimethylsulfoxide.

Infrared spectrum: The infrared absorption spectrum of ladakamycin suspended in mineral oil mull is reproduced in FIG. 1 of the drawing. Ladakamycin shows peaks at the following wave lengths expressed in reciprocal centimeters:

| | |
|---|---|
| 3390 (S) | 1235 (M) |
| 3320 (S) | 1216 (W) |
| 3200 (S) | 1200 (M) |
| 2950 (S) (oil) | 1155 (M) |
| 2920 (S) (oil) | 1137 (M) |
| 2850 (S) (oil) | 1130 (M) |
| 1968 (W) | 1109 (S) |
| 1703 (S) | 1094 (S) |
| 1680 (S) | 1073 (M) |
| 1648 (S) | 1062 (S) |
| 1610 (S) | 1050 (S) |
| 1543 (W) | 1037 (M) |
| 1535 (W) | 1006 (M) |
| 1530 (M) | 987 (M) |
| 1522 (M) | 983 (M) |
| 1508 (S) | 975 (W) |
| 1493 (S) | 965 (W) |
| 1467 (S) | 955 (W) |
| 1458 (S) (oil) | 943 (W) |
| 1438 (M) | 905 (W) |
| 1429 (M) | 885 (W) |
| 1389 (M) | 867 (W) |
| 1376 (M) | 860 (W) |
| 1368 (M) | 845 (W) |
| 1350 (W) | 838 (W) |
| 1344 (W) | 810 (W) |
| 1337 (W) | 803 (M) |
| 1318 (W) | 790 (M) |
| 1298 (S) | 750 (W) |
| 1263 (W) | 707 (M) |
| 1242 (M) | |

Band intensities are indicated as "S," "M," and "W," respectively, and are approximated in terms of the backgrounds in the vicinity of the band. An "S" band is of the same order of intensity as the strongest in the spectrum; "M" bands are between one-third and two-thirds as intense as the strongest band, and "W" bands are less than one-third an intense as the strongest band. These estimates are made on a basis of a percent transmission scale.

In vitro biological characterization of ladakamycin

The inhibition of *Escherichia coli* by ladakamycin can be reversed rather specifically by several pyrimidine compounds. The most effective reversing agent was cytidine, as demonstrated by the following experiment. *E. coli* was grown on petri plates in a completely synthetic medium. Aliquots of such synthetic agar were supplemented with different purines and pyrimidines at levels of 50 mcg./ml. Ladakamycin was applied on 6-mm. paper discs, the plates were incubated at 30° C. for 18 hours, and the resulting zones of inhibition were measured. The results are as follows:

Inhibition by ladakamycin of *E. coli* grown on various media

| Medium: | Zone of inhibition in mm. |
|---|---|
| Control—MSM [1] | 31 |
| MSM+cytidine | 0 |
| MSM+deoxycytidine | 29 |
| MSM+uridine | 17 |
| MSM+deoxyuridine | 29 |
| MSM+thymidine | 30 |
| MSM+orotic acid | 30 |
| MSM+adenosine | 28 |
| MSM+deoxyadenosine | 30 |
| MSM+guanosine | 32 |
| MSM+deoxyguanosine | 31 |
| MSM+inosine | 31 |
| MSM+xanthosine | 31 |

[1] MSM=minimal synthetic medium of following composition: $K_2HPO_4$, 3.5 g.; $KH_2PO_4$, 1.5 g.; $MgSO_4 \cdot 7H_2O$, 0.1 g.; $(NH_4)_2SO_4$, 1.0 g.; glucose, 2.0 g.; agar, 15.0 g.; distilled water, 1 liter.

We claim:
1. An antibiotic assaying at least 12 biounits/ml. of ladakamycin, a compound which
 (a) is effective in inhibiting the growth of various Gram-negative bacteria; and in its essentially pure crystalline form
 (b) is soluble in water and slightly soluble in methanol, acetone, chloroform, hexane, and dimethylsulfoxide;
 (c) has the following elemental analyses: C, 39.25; H, 5.04; N, 22.87; O, 31.44;
 (d) has an empirical formula $C_8H_{12}N_4O_5$;
 (e) has a characteristic ultraviolet absorption spectrum as follows:

| Solvent | Max., mμ | a |
|---|---|---|
| Water | 241 | 35.9 |
| .01 N HCl | 249 | 12.6 |
| .01 N KOH | 223 | 99.1 |
| | (¹) | 6.3 |

¹ 253 sh.

(f) has a melting point 228–230° C.; and
(g) has a characteristic infrared absorption spectrum as shown in FIG. 1 of the accompanying drawing.

2. A compound, ladakamycin, according to claim 1, in its essentially pure form.

3. A compound, ladakamycin, according to claim 1, in its essentially pure crystalline form.

4. A process which comprises cultivating *Streptoverticillium ladakanus* var. *ladakanus* in an aqueous nutrient medium under aerobic conditions until substantial antibacterial activity is imparted to said medium by production of ladakamycin.

5. A process which comprises cultivating *Streptoverticillium ladakanus* var. *ladakanus* in an aqueous nutrient medium containing a source of assimilable carbohydrates and assimilable nitrogen under aerobic conditions until substantial antibacterial activity is imparted to said medium by production of ladakamycin and isolating the ladakamycin so produced.

6. A process according to claim 5 in which the isolation comprises filtering the medium and then contacting the filtrate with an adsorbent for ladakamycin the compound defined in claim 1, and recovering ladakamycin from the adsorbent.

References Cited
UNITED STATES PATENTS
3,027,300  3/1962  Bergy et al. _____ 167—65

JOHNNIE R. BROWN, Primary Examiner

U.S. Cl. X.R.

195—80; 260—211.5 R; 424—180, 181